(12) United States Patent
Khoo et al.

(10) Patent No.: US 11,352,528 B1
(45) Date of Patent: Jun. 7, 2022

(54) ADHESIVE COMPOSITIONS THAT CONTAIN ADHESIVE POLYMER AND CARBON NANOTUBES, AND RELATED PRODUCTS AND METHODS

(71) Applicant: Seagate Technology LLC, Cupertino, CA (US)

(72) Inventors: PengBoon Khoo, Anchorvale (SG); Li Hong Zhang, Clementi (SG); Swee Chuan Gan, Bishan (SG); Xiong Liu, Bukit (SG)

(73) Assignee: Seagate Technology LLC, Fremont, CA (US)

( * ) Notice: Subject to any disclaimer, the term of this patent is extended or adjusted under 35 U.S.C. 154(b) by 156 days.

(21) Appl. No.: 16/299,604

(22) Filed: Mar. 12, 2019

(51) Int. Cl.
| | | |
|---|---|---|
| *C09J 9/02* | (2006.01) | |
| *C09J 11/04* | (2006.01) | |
| *C09J 133/08* | (2006.01) | |
| *C09J 133/10* | (2006.01) | |
| *C09J 163/00* | (2006.01) | |
| *G11B 33/02* | (2006.01) | |
| *C09J 183/04* | (2006.01) | |
| *C08K 3/04* | (2006.01) | |
| *C09J 7/22* | (2018.01) | |
| *C09J 7/40* | (2018.01) | |
| *G11B 7/24024* | (2013.01) | |

(52) U.S. Cl.
CPC .............. *C09J 11/04* (2013.01); *C09J 9/02* (2013.01); *C09J 133/08* (2013.01); *C09J 133/10* (2013.01); *C09J 163/00* (2013.01); *C09J 183/04* (2013.01); *G11B 33/027* (2013.01); *C08K 3/041* (2017.05); *C09J 7/22* (2018.01); *C09J 7/401* (2018.01); *C09J 2203/326* (2013.01); *G11B 7/24024* (2013.01); *Y10T 428/287* (2015.01); *Y10T 428/2852* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 7,522,375 | B2 | 4/2009 | Tsuda et al. |
| 7,605,999 | B1 * | 10/2009 | Kung ................... G11B 25/043 360/99.18 |
| 9,025,279 | B2 | 5/2015 | Furuta et al. |
| 9,159,205 | B1 | 10/2015 | Tafreshi et al. |
| 9,293,169 | B2 | 3/2016 | Andrikowich et al. |
| 9,852,777 | B2 | 12/2017 | Albrecht |
| 10,381,049 | B2 * | 8/2019 | Zhang ..................... H05K 5/06 |
| 2002/0008932 | A1 * | 1/2002 | Bateman ............. G11B 17/043 360/96.51 |
| 2003/0133222 | A1 | 7/2003 | Ong et al. |
| 2003/0179489 | A1 | 9/2003 | Bemett et al. |
| 2005/0019519 | A1 | 1/2005 | Guo et al. |
| 2005/0062024 | A1 * | 3/2005 | Bessette ..................... C09J 7/38 252/500 |
| 2008/0292840 | A1 | 11/2008 | Majumdar et al. |
| 2009/0011232 | A1 | 1/2009 | Dai et al. |
| 2010/0124627 | A1 | 5/2010 | Nonaka et al. |
| 2012/0152037 | A1 * | 6/2012 | Wade .................... G01L 1/2231 73/862.627 |
| 2016/0314721 | A1 | 10/2016 | Hasegawa et al. |
| 2020/0218060 | A1 * | 7/2020 | Luizzi ............... G02B 26/0858 |

FOREIGN PATENT DOCUMENTS

JP         2004146011 A  *  5/2004

OTHER PUBLICATIONS

Sumi Shigeji et al., "Magnetic Disk Driving Device, And Conductive Adhesive", machine translation of JP 2004146011A, May 20, 2004 (Year: 2004).*
Sumi, Shigeji et al., "Magnetic Disk Drive Device And Conductive Adhesive", English translation of JP2004146011A, May 20, 2004 (Year: 2004).*

* cited by examiner

*Primary Examiner* — Anish P Desai
(74) *Attorney, Agent, or Firm* — Kagan Binder, PLLC

(57) ABSTRACT

Described are adhesive compositions that contain adhesive polymer and carbon nanotubes; devices (e.g., electronic devices and electronic device enclosures) and compositions that include one of these adhesive compositions; and uses of such adhesive compositions as part of an electronic device.

19 Claims, 4 Drawing Sheets

ADHESIVE COMPOSITIONS THAT CONTAIN ADHESIVE POLYMER AND CARBON NANOTUBES, AND RELATED PRODUCTS AND METHODS

FIELD OF THE INVENTION

The following description relates to adhesive compositions that contain adhesive polymer and carbon nanotubes; devices and compositions that include one of these adhesive compositions; and uses of such adhesive compositions as part of an electronic device, for example as an adhesive cover seal to bond an enclosure cover to an enclosure base, as an adhesive to secure an "cover seal" to an enclosure cover to close an opening (e.g., a fill port) in the enclosure cover, or as an adhesive to secure a tamper-evident label to a surface of the enclosure.

BACKGROUND

Commercial electronic devices such as hard disk drives include internal components that include highly complex mechanical, electrical, and magnetic devices contained in a rigid enclosure. In many or most commercial versions of these devices, the enclosure is two-piece metal enclosure that includes a base and an opposed cover. When assembled, the base and the cover define an interior cavity that contains the working internal components. At various locations of the electronic device, and for different purposes, an item, component, surface, or structure of the device is secured to a different item, component, surface, or structure of the device by an adhesive composition (or "adhesive" for short). Three example uses of an adhesive as part of an electronic device are: as an "adhesive seal" to bond a flat surface of a rigid cover to a flat surface of a rigid base; as an adhesive used to bond a cover seal (e.g., a helium fill port cover seal) to an external surface of an electronic device to cover an opening (e.g., a helium fill port); and as an adhesive used to bond a tamper-evident ("tamper-resistant") label to a surface of a device, e.g., to exterior surface of the cover, the base, or both.

In use, an electronic device may be exposed to conditions that will stress its components, including adhesives. Such conditions include elevated temperatures, low temperatures, and cycles between elevated and low temperatures. Adhesion properties (e.g., strength) of an adhesive can degrade with increasing temperature due to viscoelastic thinning and structural decomposition, leading to interfacial debonding or surface losing tamper evidence. Temperature cycles can result in additive stress to the adhesive.

Some electronic devices, e.g., hard disk drives, may be operated for extended periods of time at temperatures that exceed 40, 50, or 60 degrees Celsius. Adhesive compositions for these devices should be stable at these temperatures.

SUMMARY

The following description relates to adhesive compositions that contain adhesive polymer and carbon nanotubes; devices and compositions that include one of these adhesive compositions; and uses of such adhesive compositions as part of an electronic device, for example as a cover seal, as an adhesive to secure a fill port cover to a cover, or as an adhesive to secure a tamper-evident label to a surface of the enclosure.

Electronic devices include adhesive compositions to bond together two different surfaces or portions of the device. To withstand conditions of use, such as elevated temperature, the adhesives are preferably stable at high temperatures such as greater than 40, 50, or 60 degrees Celsius, meaning that their adhesion properties do not degrade to a degree that causes the adhesive to prematurely fail. For other specific reasons, high temperature stability may be necessary for particular components of a device such as a tamper-evident label. A tamper-resistant label should not be cleanly removable by applying heat to the label. For this reason, an adhesive for a tamper-evident label of an electronic device might desirably be stable at temperatures that exceed 70 or 80 degrees Celsius.

More generally, an adhesive that is useful for securing one structure of an electronic device to another structure of the device should exhibit good adhesive performance properties (including good adhesion properties over a range of temperatures), good stability of adhesive performance properties over time, and good stability upon exposure to high or low temperatures or temperature cycling. In addition to adhesion properties, certain physical or performance properties other than adhesion properties (i.e. "non-adhesion" properties) are also useful, including: high heat conductivity to allow for efficient removal of heat from the electronic device; high electrical conductivity to reduce the risk of damage caused by electrostatic discharge; and a coefficient of thermal expansion of the adhesive that most closely matches that of other nearby structures of the electronic device such as a metal.

According to the present description, Applicant has identified new and inventive adhesives that include adhesive polymer and carbon nanotubes. The adhesives may be part of a new and inventive adhesive product (e.g., multi-layer adhesive-containing film stack or an article that contains the film stack), a new and inventive electronic device or component thereof that includes the adhesive or adhesive product, or a new and inventive use of the adhesive (or adhesive product) as part of an electronic device. The adhesive exhibits adhesion and non-adhesion properties that are useful or advantageous for an adhesive of an electronic device, and in preferred embodiments exhibits adhesion and non-adhesion properties that are improved because of the presence of carbon nanotubes in the adhesive (when compared to properties of an identical adhesive that does not contain nanotubes).

Additionally, and in a manner that would not have been expected and that may be considered counterintuitive, preferred adhesives of the present description, that contain carbon nanotubes within an adhesive polymer, may also exhibit increased adhesion properties (e.g., adhesion strength) as temperature of the adhesive is increased, such as at temperatures that increase above 25 degrees Celsius, e.g., from 30 or 40 degrees Celsius up to about 200 degrees Celsius. An adhesion property (e.g., adhesive strength, adhesive shear strength, tensile strength, adhesive peel strength, adhesive fracture toughness) of the adhesive can be greater at an elevated temperature (e.g., at 40, 50, or 60 degrees Celsius) than is the adhesion property at a lower temperature (e.g., at 20, 25, or 30 degrees Celsius) when measured the same way, using the same test method, equipment, materials, and test conditions.

In one aspect, the invention relates to an electronic device that includes a base, a cover, an interior between the base and the cover, and adhesive that includes adhesive polymer and carbon nanotubes.

In another aspect, the invention relates to a method of assembling an electronic device that includes a base, a cover, and an interior between the base and the cover. The method includes using adhesive to bond a surface of one component of the device to a surface of a second component of the device.

Figure 1:
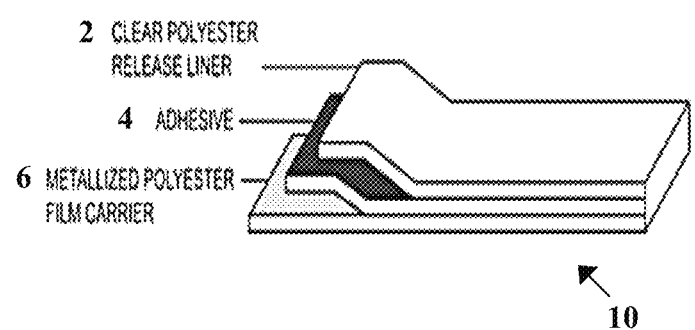
FIG. 1 shows an example of a multi-layer adhesive structure that contains an adhesive of the present description.

All figures are schematic and are not necessarily to scale.

DETAILED DESCRIPTION

The following description relates to adhesive compositions (a.k.a. "adhesives") that are useful in securing one item, surface, or structure of an electronic device such as a hard disk drive, to another item, surface, or structure of the electronic device.

Electronic devices such as hard disk drives include an enclosure that includes two opposed pieces: a base and an opposed cover. The base and cover define an interior that contains mechanical, electronic, and magnetic components that make up much or all of the working components of the electronic device. An enclosure of a hard disk drive, as an example, will contain at least one hard magnetic recording disk, optionally a stack of multiple hard magnetic disks, a spindle motor for rotating the disk or stack of disks, one or more magnetic head assemblies useful to read and write data from a magnetic layer of a hard magnetic disk, and related support structures and electronic components such as an actuator assembly, bearings, and electronics to operate and manage the device for receiving, storing, and allowing retrieval of the digital data. The hard disk drive may include any number of hard disks, and the disks may be sized as desired. The interior atmosphere of a hard disk drive or any other type of electronic device may be of any gaseous fluid such as air or a low density gas such as helium. The device may also include a tamper-evident label secured to an interior or external surface by use of an adhesive, an adhesive cover that closes or seals an opening in an enclosure cover of the device, or one or more other structures bonded to the device by an adhesive.

While the invention described herein sometimes emphasizes the use of the described adhesives with a hard disk drive enclosure, the reader will appreciate that the described adhesives and methods of use are also useful with other types of electronic device enclosures such as (but not limited to) an enclosure of an optical disk drive, non-magnetic storage device, or an enclosure for another type of electronic or microelectronic device, and that the described adhesives and methods are not limited to applications relating to hard disk drive enclosures.

In assembling various types of electronic device, structures of an electronic device may be held together using an adhesive. For example, some electronic devices include an adhesive to secure an enclosure cover, e.g., an outer cover or a "cover seal", to an opposed enclosure base (these adhesives are sometimes referred to as an "adhesive seal"). Some electronic devices include an adhesive to secure a tamper-evident (or "tamper-resistant") label to a surface of the device. Some electronic devices include an adhesive to secure a flexible adhesive cover to an outer surface of the device, e.g. to the enclosure cover, to cover (and close) an opening, such as to close an opening used to access the interior of the enclosure to remove a gaseous atmosphere from the interior or to fill the interior with a desired gaseous atmosphere (e.g., a low density gas such as helium). Such an opening in a device enclosure is sometimes referred to as a "fill port" or "helium-fill port," and the flexible adhesive cover is sometimes referred to as a "helium fill port cover."

An adhesive that is useful for securing one structure of an electronic device to another structure of the device should exhibit good performance properties (including good adhesion properties over a range of temperatures), good stability of adhesion properties over time, and good stability upon exposure to high or low temperatures or temperature cycling.

In addition to adhesion properties, certain other physical or performance properties (i.e. "non-adhesion" properties) are also relevant to the use of an adhesive as part of an electronic device. These include: high heat conductivity to allow for efficient removal of heat from a device during use; high electrical conductivity to reduce the risk of damage caused by electrostatic discharge; and a coefficient of thermal expansion of the adhesive that matches as closely as possible that of other nearby structures of the electronic device. According to the present description, one or more such properties of an adhesive as described can allow the adhesive to be included as part of an electronic device, and may preferably be improved because of the presence of carbon nanotubes in the adhesive (relative to an adhesive of identical composition but not including carbon nanotubes).

Additionally, and in a manner that would not have been expected and that may be considered counterintuitive or unexpected, an adhesive that contains carbon nanotubes within an adhesive polymer may additionally or alternately be found to exhibit increased adhesion properties (e.g., adhesion strength) as temperature of the adhesive is increased, such as with a temperature increase to above 40, 50, or 60 degrees Celsius or up to about 200 degrees Celsius (as compared to the adhesion property measured at 20 or 25 degrees Celsius). Without being bound by theory, this counter-intuitive increase in an adhesion property such as adhesion strength with increasing temperature may be due to a "nano-interlock" formation that occurs between the carbon nanotubes and the polymer adhesive, whereby physically entangled nanotubes in the adhesive composition become physically interlocked with the adhesive polymer. The structure of interlocked adhesive polymer and carbon nanotubes is believed to be capable of penetrating depressions or other small structural variations in a flat surface of an adherend, with tips or ends of the nanotubes spread into a web-like structure to increase contact area and adhesion to the adherend through van der Waals interactions. With the presence of the carbon nanotubes, adhesion strength of the adhesive may increase with temperature because: the "nano-interlock" formation between the carbon nanotubes and the polymer adhesive can increase with a rise of temperature; and because the contact area between the adhesive, including the carbon nanotubes, and the substrate, increases with a rise in temperature.

The chemical nature of adhesive polymers useful as part of an adhesive of the present description may vary over may different types of chemical classes. Well known examples of useful adhesive polymers include silicone polymers, epoxy polymers (including reactive prepolymers), and acrylic polymers. An adhesive composition may also contain other ingredients in relatively lower amounts (compared to the amount of adhesive polymer), such as tackifier resin, plasticizer, organic solvent, or a combination of these.

Different adhesives of the present description may also function according to different modes of adhesion. Examples of useful adhesive polymers include those that can be formed into an adhesive composition of a type often referred to as any of: a pressure-sensitive adhesive, a thermoplastic adhesive, a reactive or curable (e.g., thermosetting) adhesive, or a structural (non-pressure-sensitive) adhesive.

A pressure-sensitive adhesive is an adhesive that is tacky to the touch yet cohesive at a temperature at which the adhesive is used, and is capable of forming a bond with an adherend without the need to undergo a chemical reaction, such as by forming a bond upon contact and application of pressure between the adhesive and adherend. Bond formation does not require any reaction, water, heat, radiation, or other activation mechanism.

Structural adhesives include adhesives that may be either thermoplastic or thermosetting, and capable of forming a structural (mechanical) bond between two surfaces by being flowed to contact the surfaces and then solidified. An adhesive referred to as a "structural adhesive" functions by first being placed into contact with opposed surfaces, in a liquid or flowable state, and then being solidified. The adhesive may be solidified either by a chemical reaction between two different chemical materials in the adhesive, or by cooling (e.g., by being applied in a heated (e.g., liquid or molten) state and then cooled).

Thus, example structural adhesives may be thermoplastic or non-thermoplastic (e.g., "thermosettable"). A polymer or adhesive that is thermoplastic is one that is capable of reversibly softening or melting to become pliable or flowable when heated to a temperature above a softening temperature characteristic of the polymer or adhesive, and that will re-solidify when cooled to a temperature below the softening temperature. Useful or preferred thermoplastic polymer or adhesives may be repeatedly heated to reversibly soften or melt, then cooled and re-solidified, without substantial degradation of the polymeric material or its properties.

As opposed to a "thermoplastic" adhesive, other example adhesives include adhesives referred to as "thermoset," "thermosettable," "thermosetting," or "curable" adhesives. A thermoset or curable adhesive is one that is irreversibly cured by chemical reaction between reactive materials (polymers, prepolymers, etc.) in the adhesive upon exposure to a condition such as heat, moisture, or radiation. Examples include curable epoxy adhesives.

Carbon nanotubes (CNTs) are allotropes of carbon with a cylindrical nanostructure. Carbon nanotubes are members of the fullerene structural family and have a long, hollow structure with walls formed by one atom thick sheets of connected carbon atoms in the form of graphene. The hollow structure may be formed to place each carbon atom at a specific distance or angle compared to an adjacent carbon atom, in a direction of a length of the hollow structure, and with a specific number of carbon atoms defining a diameter of the hollow structure. The chemical bonding of carbon atoms of nanotubes involves entirely $sp^2$-hybrid carbon atoms. These bonds are similar to those of graphite and stronger than those found in alkanes and diamond (which employ $sp^3$-hybrid carbon atoms).

Carbon nanotubes can be categorized as single-walled carbon nanotubes (SWNTs), double-walled carbon nanotubes (DWNTs), and multi-walled carbon nanotubes (MWNTs). A single-walled carbon nanotube includes only one single graphene cylinder, whereas a double-walled or a multi-walled carbon nanotube includes two walls or multiple (e.g., several) concentric graphene cylinders. For a multi-walled carbon nanotube structure, the number of concentric walls may vary from 3 to 25 or more. A diameter of a single-walled nanotube may be in a range from 0.7 to 3 nanometers. A diameter of a multi-walled nanotube structure may be larger, e.g., from about 5 to about 50 nanometers.

According to the invention, the Applicant has now determined that adding an amount of carbon nanotubes to an adhesive composition used as part of an electronic device such as a hard disk drive can produce useful or improved performance properties for the adhesive, or improved performance of an electronic device that includes the adhesive.

The amount of carbon nanotubes may be any amount that produces an adhesive that has useful or advantageous performance properties, especially when used as an adhesive in an electronic device. A useful or preferred amount of carbon nanotubes in a particular adhesive can be an amount that is based on various factors that may include: the adhesive mode of the adhesive (e.g., whether the adhesive is a pressure-sensitive adhesive, a structural adhesive, etc.), the chemical type of the adhesive polymer (e.g. whether the adhesive polymer is an acrylate (including methacrylate), a silicone, or an epoxy), the desired adhesion or non-adhesion properties of the adhesive composition, among other factors. By way of example, useful or preferred adhesive compositions may contain from 0.1 to 20 percent by weight carbon nanotubes based on total weight adhesive composition, e.g., from 0.5 to 10 or 15 weight percent carbon nanotubes, or from 1 to 5 weight percent carbon nanotubes, based on total weight adhesive composition. The balance of the adhesive composition may be made from useful adhesive materials such as adhesive polymer, optional plasticizer, optional tackifier resin, optional solvent (e.g., organic solvent or water), and other minor ingredients such as catalyst, cross-linking compounds, initiator, etc.

Stated differently, in terms of total solids (excluding water or any organic solvent present) of an adhesive composition, an adhesive composition as described may contain from 0.1 to 20 weight percent carbon nanotubes, such as from 0.5 to 10 weight percent carbon nanotubes, or from 1 to 5 weight percent carbon nanotubes, based on total weight solids (non-water, non-organic solvent) in an adhesive composition. In these compositions, the adhesive composition solids refers to all components of an adhesive composition other than water or organic solvent (from any source), including any of: adhesive polymer selected from polyacrylates (including methacrylates), polysilicone, and epoxy polymers, including prepolymers; any optional tackifier resin or plasticizer; reactive precursors to an adhesive polymer such as monomer, crosslinker, as well as catalyst or initiator, etc., used to form cured (reacted) adhesive polymer from precursors (e.g., monomers or prepolymers).

According to examples, an adhesive may have adhesion properties, non-adhesion properties, or both, that are suitable for use of the adhesive in an electronic device enclosure, and preferably that are improved when compared to properties of an otherwise identical adhesive that does not contain any carbon nanotubes (i.e., a "comparable adhesive"). A useful or improved adhesion or non-adhesion property may preferably be present over a range of temperatures at which the electronic device may be used (e.g., from negative 10 degrees Celsius to 100 degrees Celsius), and may preferably be present at even higher temperatures, e.g., from 100 degrees Celsius to 200 degrees Celsius. Also according to certain preferred example adhesives, an adhesion property may increase as temperature increases.

According to useful and preferred examples of adhesive compositions as described, the adhesive composition can have an "adhesive strength" that is greater than an adhesive strength of an adhesive of the same formulation but not containing any carbon nanotubes. In other words, the carbon nanotubes cause an increase in the adhesive strength of the adhesive. Preferably, an adhesive strength of the adhesive composition can also increase with an increased temperature.

Adhesive strength of an adhesive composition is a measure of the ability of an adhesive composition to stick to a surface and bond two surfaces together. As used herein, "adhesive strength" is measured by a test sometime referred to a "90-degree peel" method. By this test, a tape is prepared to include a film of the adhesive (e.g., at a thickness of 30 microns) applied to a flexible backing (e.g., 40 micron aluminum). The adhesive side of the tape is applied to a substrate (e.g., a metal plate) and is then pulled away from the substrate in a direction perpendicular to the substrate. The adhesive strength is measured as the force required to remove the tape from the substrate (e.g., SUS430 steel) by pulling in a direction of 90 degrees from the substrate.

Example adhesive compositions that contain carbon nanotubes as described herein can exhibit an increase in adhesive strength relative to a comparable adhesive composition that does not contain any carbon nanotubes but is otherwise identical in its composition (i.e., a "comparable" adhesive). The amount of the increase in adhesive strength can be more than an insignificant amount, for example an increase of at least 10 or 20 percent compared to the adhesive strength of the comparable adhesive, with the adhesive strength of each adhesive composition being measured using an identical test method and at identical test conditions. The increase may preferably be present over a range of temperature, such as over a range from negative 50 to 200 degrees Celsius, or over a range from negative 20 to 100 degrees Celsius. According to certain preferred example adhesives, the amount of the increase may be in a range from 25 to 200 percent, e.g., from 40 or 50 to 100 or 150 percent compared to the adhesive strength of the comparable adhesive, with the adhesive strength of each adhesive being measured using an identical test method and at identical test conditions.

Alternately or in addition, according to useful and preferred example adhesive compositions as described, the adhesive composition can have an "adhesive shear strength" that is greater than an adhesive shear strength of an adhesive of the same formulation but not containing any carbon nanotubes. In other words, the carbon nanotubes cause an increase in the adhesive shear strength of the adhesive.

Adhesive shear strength measures the strength of an adhesive bond in a shear direction. Adhesive shear strength can be measured by standard testing methods such as those defined by PSTC-107, ASTM D-3654, and ART #2054.

Example adhesive compositions that contain carbon nanotubes as described can exhibit an increase in adhesive shear strength relative to a comparable adhesive that does not contain any carbon nanotubes but is otherwise identical in composition. The increase can be more than an insignificant amount, for example an increase in adhesive shear strength of at least 10 or 20 percent compared to the adhesive shear strength of the comparable adhesive, with the adhesive shear strength of each adhesive being measured using an identical test method and at identical test conditions. The increase may preferably be present over a range of temperatures, such as over a range from about ambient temperature (e.g., about 20 degrees Celsius) to 70 degrees Celsius. According to certain preferred example adhesives, a value of an increase in adhesive shear strength may be in a range from about 20 to about 50 percent compared to the adhesive shear strength of the comparable adhesive, with the adhesive shear strength of each adhesive being measured using an identical test method and at identical test conditions.

Alternately or in addition, according to useful and preferred example adhesive compositions as described, the adhesive composition can have a "tensile strength" that is greater than a tensile strength of an adhesive of the same formulation but not containing any carbon nanotubes. In other words, the carbon nanotubes may cause an increase in the tensile strength of the adhesive. "Tensile strength" of an adhesive composition refers to the force required to break a piece of the adhesive by pulling the piece of adhesive in two opposed directions.

Example adhesives that contain carbon nanotubes as described can exhibit an increase in tensile strength relative to a comparable adhesive that does not contain any carbon nanotubes but is otherwise identical in composition. The increase can be more than an insignificant amount, for example an increase of at least 10 or 15 percent compared to the tensile strength of the comparable adhesive, with the tensile strength of each adhesive being measured using an identical test method and at identical test conditions. According to certain preferred example adhesives, the increase in tensile strength may be in a range from about 10 to about 70 percent e.g., from 15 to 50 percent, compared to the tensile strength of the comparable adhesive, with the tensile strength of each adhesive being measured using an identical test method and at identical test conditions.

Alternately or in addition, according to useful and preferred examples of adhesive compositions as described, an adhesive can have an "adhesive peel strength" that is greater than an adhesive peel strength of an adhesive of the same formulation but not containing any carbon nanotubes. In other words, the carbon nanotubes can cause an increase in the adhesive peel strength of the adhesive relative to the comparable adhesive composition.

Adhesive peel strength (or "peel strength" for short) refers to the ability of an adhesive composition to stick to a surface and bond one surface to a second surface. As used herein, "peel strength" is measured by a test sometime referred to a "180-degree peel" method. By this test, a tape is prepared to include a film of the adhesive (e.g., at a thickness of 30 microns) applied to a flexible backing (e.g., 40 micron aluminum). The adhesive side of the tape is applied to a rigid substrate (e.g., a flat metal plate (the test may be performed on an aluminum plate, a steel plate, or both)). The tape is then pulled to remove the adhesive from the substrate by pulling the tape in a direction that causes the non-adhered (removed) portion of the tape to fold back over a portion of the tape that remains adhered to the substrate; the tape is pulled in a direction that causes a removed portion of the tape to turn and become oriented with a turn of an angle of about 180 degrees so that the removed portion, during continued removal, is positioned above the portion of the tape that is still adhered to the substrate (the removed portion of the tape is pulled back over the non-removed portion of the tape) The direction of the pull is parallel to the surface of the rigid substrate and the adhered tape. Adhesive peel strength can be measured by standard testing methods such as those defined by PSTC-101, ASTM D-3330, and ART #1005.

Example adhesive compositions that contain carbon nanotubes as described herein can exhibit an increase in adhesive peel strength relative to a comparable adhesive that does not contain any carbon nanotubes but is otherwise identical in composition. The increase can be more than an insignificant amount, for example an increase in adhesive peel strength of at least 20 or 25 percent compared to the adhesive peel strength of the comparable adhesive, with the adhesive peel strength of each adhesive being measured using an identical test method and identical test conditions. According to certain preferred example adhesives, the increase in adhesive peel strength may be in a range from 30 to 100 percent, e.g., from 35 or 40 to 80 or 90 percent compared to the adhesive peel strength of the comparable adhesive, with the adhesive peel strength of each adhesive being measured using an identical test method and at identical test conditions.

Alternately or in addition, according to useful and preferred examples of adhesive compositions as described, an adhesive can have an "adhesive fracture toughness" that is greater than an adhesive fracture toughness of an adhesive of the same formulation but not containing any carbon nanotubes. In other words, the carbon nanotubes cause an increase in the adhesive fracture toughness of the adhesive relative to the comparable adhesive composition.

Adhesive fracture toughness is a measure of the amount of stress required to propagate a pre-existing flaw in a sample of an adhesive. The test is designed to measure the resistance of an adhesive to the presence of a flaw in terms of the load required to cause brittle or ductile crack extension in a standard specimen that contains a fatigue precrack; fracture toughness of an adhesive refers to an ability of an adhesive that contains a crack to resist further fracture. The result can be expressed in terms of toughness parameters such as KIc, critical J or critical CTOD.

According to useful and preferred examples of adhesive compositions as described, an adhesive can have an "adhesive fracture toughness" that is greater than an adhesive fracture toughness of a comparable adhesive that has the same formulation but does not contain any carbon nanotubes. The carbon nanotubes cause an increase in the adhesive fracture toughness. The increase can be more than an insignificant amount, for example an increase in fracture toughness of at least 20 or 25 percent compared to the fracture toughness of the comparable adhesive, with the fracture toughness of each adhesive being measured using an identical test method and at identical test conditions. According to certain preferred example adhesive compositions, the increase in fracture toughness may be at least 30 percent compared to the fracture toughness of the comparable adhesive.

Other than improved adhesion properties, an adhesive composition that contains carbon nanotubes as described may also possess non-adhesion properties that are useful or preferred for using the adhesive composition as an adhesive of an electronic device such as a hard disk drive. One example of a non-adhesion property that may be useful or improved (i.e., increased) is thermal conductivity of an adhesive. A high thermal conductivity or an increased thermal conductivity (relative to a comparable adhesive (the same adhesive but without any carbon nanotubes)) of an adhesive may be desired for an adhesive of an electronic device, because a higher rate of heat transfer from the device to an adjacent environment can result in improved operation or efficiency of operation of the electronic device. Removal of heat away from an operating electronic device is important to prevent overheating of the device, including overheating of internal electronic components. A relatively increased rate of heat removal from a device can allow operation of the device at a reduced temperature, which reduces stress caused by a higher operating temperature and potentially extends the useful life of the device. Additionally or alternately, a higher rate of heat removal may reduce power consumption during use of the electronic device because a higher operating temperature can increase levels of electrical resistance present in electronic components of the device, and higher electrical resistance during operation is associated with an increase in total power consumed by the device. Additionally or alternately, a faster rate of removal of heat from an electronic device during operation may allow for a reduced amount of cooling fans, cooling airflow, or air conditioning needed to operate the electronic device or multiple such devices (e.g., a collection or "bank" of tens or dozens of devices operating in one location) at a particular operating temperature.

Another example of an improved non-adhesion property of an adhesive composition as described is increased electrical conductivity of the adhesive relative to a comparable adhesive (the same adhesive but without any carbon nanotubes). An increase in electrical conductivity of an adhesive may allow improved dissipation of an electrical charge from the adhesive or from an electronic device that contains the adhesive, during storage, handling, or use. The amount of the increase can be more than an insignificant amount, for example an increase in electrical conductivity of at least 10, 20, 30, or 50 percent compared to the electrical conductivity of the comparable adhesive, with the electrical conductivity of each adhesive being measured using an identical test method and identical test conditions. Improved electrical conductivity and improved dissipation of electrical charge from an electronic device can reduce the risk of a static discharge from the device that may potentially damage the device. Example adhesive compositions of the present description can have an electrical conductivity in a range from $1 \times 10^3$ to $10^4$ S cm$^{-1}$ (Siemens per centimeter), e.g., at least 1.2 or $1.5 \times 10^3$ S cm$^{-1}$, which can reduce a risk of electrostatic discharge of an electronic device such as a hard disk drive that contains the adhesive relative to an identical device that contains a comparable adhesive that does not contain carbon nanotubes.

Yet another example of an improved non-adhesion property of the adhesive is a reduced coefficient of thermal expansion (relative to a comparable adhesive (the same adhesive but without any carbon nanotubes)). When a polymeric adhesive is used to bond one component of an electronic device to a second component of the electronic device, and one or both of the components are made of or are made to contain a metal piece (e.g., a thin metal plate), a difference exists between a coefficient of thermal expansion of the polymeric adhesive and the coefficient of thermal expansion of the metal. The difference in the coefficients of thermal expansion of these materials can cause stress, wear, potential defect formation, failure of the adhesive, or failure of an adhesive bond between the two components at high temperature conditions, upon exposure to multiple temperature cycles, or during manufacturing (e.g., during a welding step).

Metals typically have significantly lower coefficients of thermal expansion compared to polymeric materials. Polymethylmethacrylate, for example, has a coefficient of thermal expansion of from 70 to 77 $10^{-6}$ m/m K (micrometer (μm) per meter per degree Kelvin), while coefficients of thermal expansion of metals can be significantly lower, e.g., 21 to 24 $10^{-6}$ m/m K for aluminum (with both values measured at approximately ambient temperature, e.g., 20 to 25 degrees Celsius).

According to the present description, a coefficient of thermal expansion of a polymeric adhesive composition (e.g., measured at 22 degrees Celsius) can be reduced and brought closer to a coefficient of thermal expansion of a metal by including carbon nanotubes in the adhesive. Example adhesive compositions that contain carbon nanotubes as described can exhibit a decrease in a coefficient of thermal expansion relative to a comparable adhesive that does not contain any carbon nanotubes but is otherwise identical in composition. The decrease can be more than an insignificant amount, for example a decrease of at least 5, 10, or 20 micrometer (μm) per meter per degree Kelvin. Example adhesive compositions that contain adhesive polymer and carbon nanotubes, as described, can preferably have a coefficient of thermal expansion that is not greater than 70 micrometer (μm) per meter per degree Kelvin, e.g., a coefficient of thermal expansion in a range from 30 or 35, up to 50 or 60 micrometer (μm) per meter per degree Kelvin.

An adhesive composition as described can be prepared in any convenient and useful fashion, for example as an adhesive film supported by one or more supportive layers such as backing, a release liner, a carrier liner, or the like. As one example, for use as an adhesive to secure a flexible adhesive item (e.g., a helium fill port cover or a tamper evident label) to a surface of an electronic device enclosure, the adhesive may be prepared and applied as a thin film to a surface of the flexible item, and optionally covered with a release liner. The flexible adhesive item may include multiple layers (e.g., different polymeric layers or coatings), as required to function as a fill port cover, tamper-evident label, or other type of flexible adhesive item. Alternately, the adhesive may be positioned as a thin adhesive film on a non-flexible item such as a rigid (e.g., metal) base or cover (e.g., cover seal) of an electronic device, also optionally being covered with a release liner. For these or for other applications, the adhesive may be adapted to be applied by an adhesive transfer method by placing a thin film of the adhesive, e.g., alone or with a flexible backing, onto a release liner or an adhesive transfer liner that allows the thin film adhesive to be transferred from the release liner to a selected substrate such as a flexible item, a metal (e.g., coated metal) cover of an enclosure, or the like.

For any of these or other useful applications of an adhesive composition as described, the thin film adhesive may be continuous or discontinuous, e.g., may be in the form of a non-continuous, regular or repeating pattern of the described adhesive optionally in combination with or disposed on a surface along with or between a pattern of a different type of adhesive, e.g., a second adhesive that is chemically similar (e.g., of the identical or similar chemical composition) but does not contain carbon nanotubes.

In the form of an adhesive film, the adhesive may have any useful thickness, such as a thickness in a range of up to about 5 or 10 mils, for example a thickness in a range from 0.1 to 5 mils, or from 0.5 to 3 or 4 mils.

In some applications, to provide for convenience of use when handling and placing a layer (thin film) of the adhesive between one surface of an electronic device enclosure and a second surface of the enclosure, one surface of an adhesive film can be placed in contact with a release liner (or "transfer liner" or simply "liner"), which can be a flat polymeric film that can be useful to receive, support, and carry a film of the adhesive layer, and from which the adhesive film layer can be easily and readily removed, e.g., transferred to an adherend or substrate. A second non-adhesive film layer, e.g., release liner or carrier film, can be placed to contact a second surface of the adhesive layer.

FIG. 1 shows an example of an adhesive film product that includes an adhesive film as described, along with a release layer and a carrier layer. Referring to FIG. 1, stack 10 includes clear polyester release liner 2 (2.0 mils thick), adhesive film layer 4 (1.0 mil), and metallized polyester film carrier 6. Adhesive layer 4 is an adhesive as described herein, containing adhesive polymer and carbon nanotubes. This multi-layer construction, stack 10, allow for easy use of adhesive film layer 4, e.g., by transferring the adhesive film to an adherend (not shown) by removing the release liner to expose a first surface of the adhesive film, contacting the exposed surface with an adherend, then removing the carrier layer to expose a second surface of the adhesive film; a second adherend can then be placed in contact with the exposed second surface.

Each of release liner 2 and carrier 6 may be a polymeric film that is coated on one major surface (the surface facing adhesive 4) with a release material (e.g., a silicone release material or, preferably, a non-silicone release material) that will release from, i.e., have low adhesion to, a surface of adhesive film 4. Examples of polymeric films that can be coated with release material include temperature stable plastic films such as: polyester films, e.g., poly(ethylene terephthalate) (PET) films, poly(ethylene naphthalate) (PEN) film, and poly(butylene terephthalate) (PBT) films; olefinic films prepared from one or more α-olefins as monomer components, such as polyethylene (PE) films, polypropylene (PPs) films, polymethylpentene (PMP) films, ethylene-propylene copolymer films, and ethylene-vinyl acetate copolymer (EVA) films; poly(vinyl chloride) (PVC) films; vinyl acetate resin films; polycarbonate (PC) films; among others.

Figure 2:
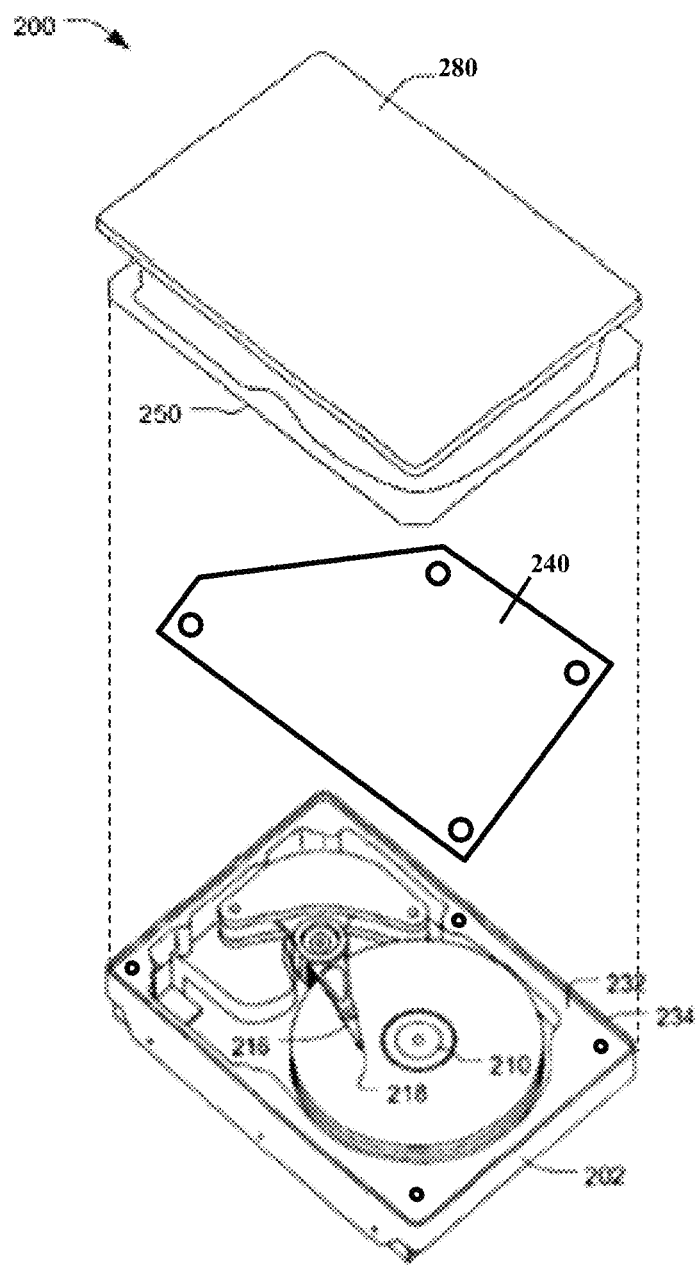
FIG. 2 is an exploded side-perspective view of an example of an electronic device in the form of a hard disk drive that contains an adhesive of the present description.

With reference to one example product construction, an adhesive composition as described can be useful as part of a cover seal that seals and encloses an electronic device which may be, for example, a hard disk drive. FIG. 2 shows a partially exploded isometric view of a disk drive 200, which includes metal base 202, metal cover 240, and cover seal 280, which includes a metal plate and adhesive film 250, which is an adhesive as described herein, containing carbon nanotubes. When assembled to form hard disk drive 200, base 202 provides a bottom surface and an interior space for containing the working components of the hard disk drive such as a disk stack assembly 210, actuator assembly that includes an array of actuator arms 216, each of which includes a read/write head 218 for addressing each of the disks, and related electronics, controls, and support structures.

Around a perimeter of the base is sidewall 234 projecting vertically from a bottom of base 202. Sidewall 234 includes upper horizontal surfaces 232, which are horizontal planar surfaces that are substantially parallel to a plane of the bottom of base 202. Cover 240 as illustrated (made of metal such as steel) is shaped and sized to allow a bottom surface thereof to engage base 202 so that cover 240 covers a portion of the upper opening of base 202 to at least partially enclose the interior space and contents of hard disk drive 200. Cover 240 may be substantially flat, as illustrated. Gaps or spaces may be present between a perimeter or edge of cover 240 and base 202. Cover 240 can be attached to base 202 by an adhesive or by screws. As illustrated, cover 240 includes openings for screws or another fastener (not shown) to secure cover 240 to base 202. These can be offset to prevent a surface of the screw or other fastener from extending above an upper surface of cover 240.

Cover seal 280 (which can also be referred to as a "cover" or "outer cover") can include a thin metal (e.g., aluminum) plate that contacts a perimeter of base 202 and encloses the interior space and contents of hard drive 200, including cover 240. Cover seal 280, including adhesive 250, can be effective to cover and seal any gaps that exists between base 202 and cover 240. The adhesive bond formed by adhesive 250 between cover seal 280 and base 202 can be secure even without any mechanical fasteners such as a screw, rivet, mechanical (e.g., snap-fit) engagement, etc. Adhesive film 250 is provided at or near the perimeter of cover seal 280 and need not be present over the remaining (interior, non-perimeter) surface of the bottom of cover seal 280. Cover seal 280 and base 202 can be bonded together by adhesive 250 in an air-tight, water-tight, e.g., hermetic fashion, to provide a sealed enclosure within which the various functioning hard disk drive components reside.

The shapes of cover seal 280 and adhesive film 250, and the locations of engagement between cover seal 280, adhesive film 250, and base 202 can be as desired. In various embodiments not shown at FIG. 2, cover seal 280 and adhesive film 250 may include a vertically-extending lip or flange that is located beyond the perimeter of base 202 and sidewalls 234 and that wraps around one or more of sidewalls 234 and contacts an exterior vertical surface of one or more sidewalls 234. In this design, adhesive 250 can be located between an inner surface of the vertical-extending lip or flange of cover seal 280 and the vertically-extending outer surface of a sidewall 234, to provide an adhesive bond between the lip or flange of cover seal 280 to the outer surface of sidewall 234.

Additional details of hard disk drives that include an adhesive to bond a cover to a base, or a cover seal to a cover and a base, are described in Unites States Patent Application Publication 2003/0133222.

Figure 3:
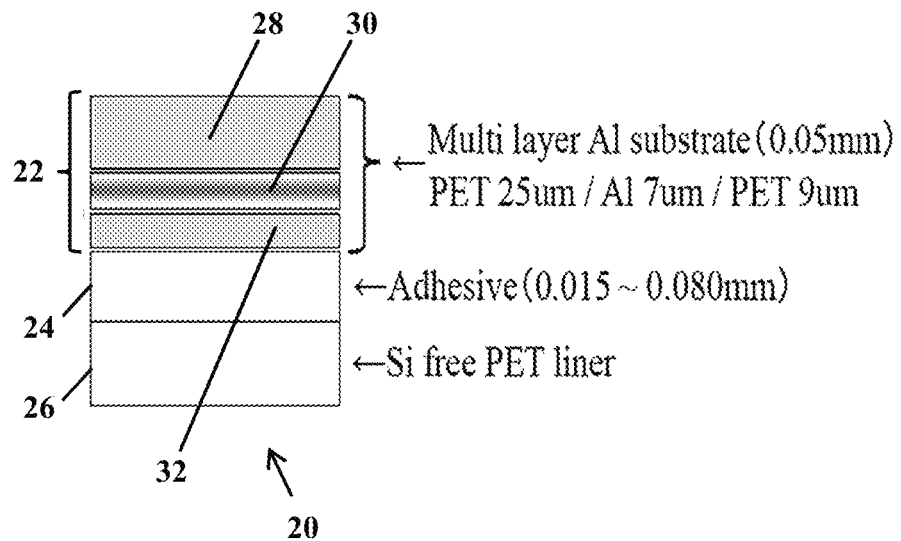
FIG. 3 shows an example of a multi-layer structure that contains an adhesive of the present description bonded to a metal enclosure cover of an electronic device.

Shown at FIG. 3 is an example of a metal cover (e.g., cover seal) of an electronic device enclosure that includes an adhesive film as described. Cover 20 includes a multi-layer aluminum cover 22, adhesive film 24, and release liner 26. Multi-layer cover 22, as illustrated, includes a flat aluminum (or aluminum alloy) piece having a thickness of about 7 microns, an upper polyester coating (e.g., of about 25 micron thickness) and a lower (bottom) polyester coating (e.g., having a thickness of about 9 microns. Adhered to the surface of the lower polyester coating is adhesive 24, as described herein, including carbon nanotubes, in the form of a thin film having a thickness of about 0.015 to about 0.080 millimeters (e.g., from about 15 to about 80 microns or from about 0.6 to about 3 mils).

Figure 4:
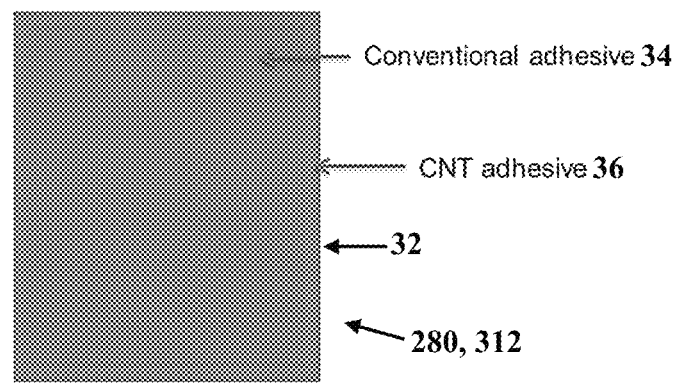
FIG. 4 is a bottom view of a surface of a sample enclosure cover that includes an adhesive film as described.
Figure 5:
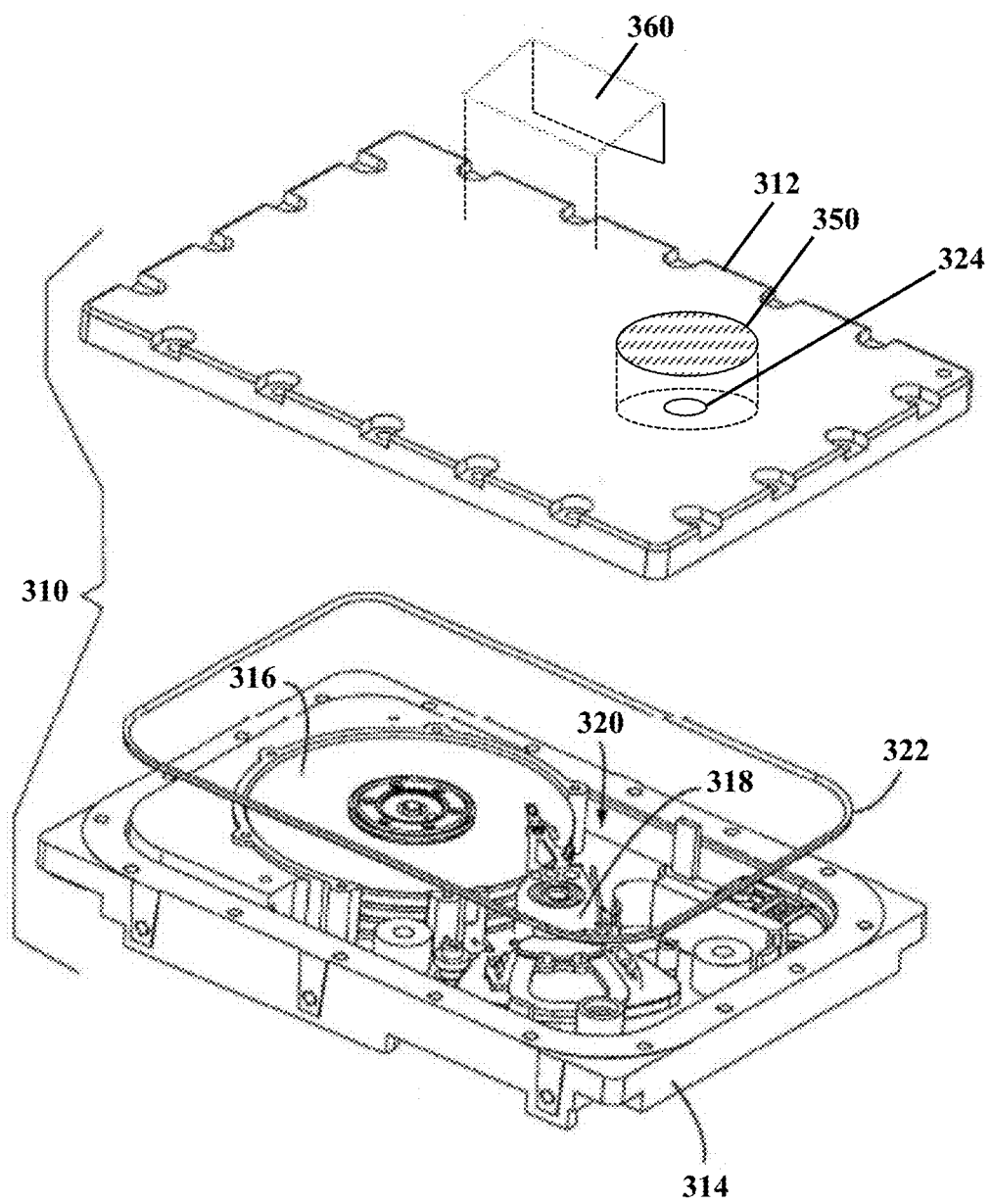
FIG. 5 is an exploded side-perspective view of an example of an electronic device in the form of a hard disk drive that contains adhesive of the present description.

FIG. 4 shows an example of bottom surface 32 of a cover 280 or 312 (see FIG. 5). Bottom surface 32 is covered entirely by adhesive. At perimeter 36, where cover 280 or 312 will contact an opposed surface of a base or electronic device, the adhesive is an adhesive as described, which contains adhesive polymer and carbon nanotubes. At non-perimeter ("interior") locations 34, the adhesive is a conventional adhesive (e.g., epoxy, acrylate, silicone), e.g., of a type previously used as a cover seal adhesive for a hard disk drive or other electronic device, and that does not contain any carbon nanotubes.

With reference to different product constructions, an adhesive composition as described can be useful to secure a fill port cover (e.g., a helium fill port cover, sometimes referred to as a "dot cover") to an exterior surface of an electronic device enclosure. FIG. 5 shows a hard disk drive assembly 310 that includes a base, a cover, internal hard disk drive components, an opening in the cover that functions as a helium fill port, and a flexible adhesive fill port cover that can be adhered to the outer surface of the cover to cover the helium fill port. The flexible adhesive seal includes an adhesive as described, which contains carbon nanotubes.

FIG. 5 shows an exploded side perspective view of low density gas disk drive 310. In general terms, the disk drive includes cover 312, base 314, a plurality of memory disks or disk stack 316, and actuator assembly 318. The disk stack and actuator assembly are positioned in an interior space 320 when cover 312 is attached to base 314. Perimeter seal 322 is positioned between the cover and base to prevent low density gas within the chamber from escaping between the assembled cover 312 and base 314. As can also be seen in FIG. 5, the cover is provided with opening 324, which is a helium fill port. Additional openings are located at the perimeters of base 314 and cover 312 to allow fasteners (e.g., screws) to secure cover 312 to base 314.

Helium fill port cover 350 is placed over opening 324 to cover and seal opening 324. Fill port cover 350 is made of a polymeric backing (e.g., polyester) and has a bottom surface coated with a thin film of adhesive as described herein, i.e., that contains adhesive polymer and carbon nanotubes. After fill port opening 324 is used to fill interior space 320 with a low density atmosphere such as concentrated helium, and optionally closed by a mechanical or other closure, helium fill port cover 350 is placed over opening 324 with the adhesive being bonded to an outer (upper) surface of cover 312.

Additional details of hard disk drives that include a helium fill port and an adhesive cover seal placed over the helium fill port are described in U.S. Pat. No. 9,293,169.

Also shown at FIG. 5 is tamper-evident label 360. Label 360 can be made of a multi-layer tamper-evident construction, as is known for tamper-evident labels. The tamper-evident label includes a polymeric backing and has a bottom surface coated with a thin film of adhesive as described herein, i.e., that contains adhesive polymer and carbon nanotubes. In various examples, one or more polymeric or adhesive layers of the multi-layer label may include scoring to cause a portion of the layer to remain behind if the label is removed, optionally in combination with printing that becomes visible upon removal or an attempted removal of the tamper-evident label from an adherend.

Additional details of hard disk drives that include a tamper-evident label are described in Unites States Patent Application Publication 2016/0314721, the entire contents of which are incorporated herein by reference.

The invention claimed is:

1. A hard disk drive device comprising a base, a cover, an interior between the base and the cover, and adhesive over a surface of the base, the cover, or both, the adhesive comprising first adhesive that comprises adhesive polymer and carbon nanotubes, and second adhesive that does not contain carbon nanotubes, the first adhesive and the second adhesive form a pattern on the surface.

2. The hard disk drive device of claim 1 wherein the first adhesive contains from 0.1 to 20 percent by weight of the carbon nanotubes based on total weight of the first adhesive.

3. The hard disk drive device of claim 1 wherein the first adhesive contains from about 1 to about 5 percent by weight of the carbon nanotubes based on total weight of the first adhesive.

4. The hard disk drive device of claim 1 wherein the first adhesive has an adhesive strength that is at least 10 percent greater than an adhesive strength of a first adhesive of identical formulation but not containing the carbon nanotubes.

5. The hard disk drive device of claim 1 wherein the first adhesive has a shear strength that is at least 10 percent greater than a shear strength of a first adhesive of identical formulation but not containing the carbon nanotubes.

6. The hard disk drive device of claim 1 wherein the first adhesive has a tensile strength that is at least 10 percent greater than a tensile strength of a first adhesive of identical formulation but not containing the carbon nanotubes.

7. The hard disk drive device of claim 1 wherein the first adhesive has a 180 degree peel strength that is at least 20 percent greater than a 180 degree peel strength of a first adhesive of identical formulation but not containing the carbon nanotubes.

8. The hard disk drive device of claim 1 wherein the first adhesive has a fracture toughness that is at least 20 percent greater than a fracture toughness of a first adhesive of identical formulation but not containing the carbon nanotubes.

9. The hard disk drive device of claim 1 wherein the first adhesive has a coefficient of thermal expansion in a range from 20 to 50 micrometer ($\mu$m) per meter per degree Kelvin.

10. The hard disk drive device of claim 1 wherein the first adhesive has an electronic conductivity of at least 1,000 Siemens per centimeter.

11. The hard disk drive device of claim 1 wherein the adhesive polymer is selected from: an acrylate, a methacrylate, an epoxy, and a silicone.

12. The hard disk drive device of claim 1 wherein the base comprises a metal, the cover comprises a metal, and the adhesive is bonded to the cover, the base, or both.

13. The hard disk drive device of claim 12 wherein the adhesive is over the surface of the cover, wherein the first adhesive is at a perimeter of the cover and the second adhesive is at a non-perimeter of the cover.

14. The hard disk drive device of claim 1 wherein the adhesive secures a tamper-evident label to the base or cover of the device.

15. The hard disk drive device of claim 1 wherein the adhesive secures a fill port cover to the surface of the cover, over an opening in the cover.

16. The hard disk drive device of claim 1 wherein the adhesive bonds a tamper-evident label to the base, the cover, or both.

17. The hard disk drive device of claim 1 wherein the adhesive bonds a fill port cover to the surface of the cover.

18. The hard disk drive device of claim 1 wherein the first adhesive forms a repeating pattern over the surface of the base, the cover, or both.

19. The hard disk drive device of claim 1 wherein the adhesive is a film having two opposed sides, one side contacts the cover or the base, and the other side contacts a release liner.

* * * * *